United States Patent
Lee et al.

(10) Patent No.: US 7,298,588 B2
(45) Date of Patent: Nov. 20, 2007

(54) MAGNETIC RECORDING MEDIA USING DIRECTLY TEXTURED GLASS

(75) Inventors: Li-Lien Lee, San Jose, CA (US); Shanghsien Rou, Fremont, CA (US); Romulo Ata, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 228 days.

(21) Appl. No.: 10/869,007

(22) Filed: Jun. 15, 2004

(65) Prior Publication Data

US 2004/0258925 A1  Dec. 23, 2004

Related U.S. Application Data (60) Provisional application No. 60/479,617, filed on Jun. 17, 2003.

(51) Int. Cl.
   *G11B 5/65* (2006.01)
   *G11B 5/738* (2006.01)

(52) U.S. Cl. ............... 360/131; 360/135; 428/829; 428/831.2; 428/832; 428/832.1; 428/832.2

(58) Field of Classification Search ............... None
   See application file for complete search history.

(56) References Cited

U.S. PATENT DOCUMENTS

| | | | |
|---|---|---|---|
| 4,654,276 A * | 3/1987 | Ahlert et al. | ............... 428/641 |
| 4,883,711 A | 11/1989 | Shiroishi et al. | |
| 5,147,732 A | 9/1992 | Shiroishi et al. | |
| 5,759,681 A | 6/1998 | Hosoe et al. | |
| 6,057,021 A | 5/2000 | Ishikawa et al. | |
| 6,166,885 A | 12/2000 | Yamamoto et al. | |
| 6,183,832 B1 * | 2/2001 | Margulies et al. | ............... 428/830 |
| 6,403,240 B1 | 6/2002 | Kanbe et al. | |
| 6,596,420 B2 | 7/2003 | Kanbe et al. | |
| 6,623,874 B2 | 9/2003 | Kanbe et al. | |
| 6,709,775 B1 * | 3/2004 | Takahashi et al. | ......... 428/831.2 |
| 6,743,529 B2 * | 6/2004 | Saito et al. | ............... 428/846.9 |

(Continued)

OTHER PUBLICATIONS

D.J. Twisselmann et al., "Origins of substrate-topography-induced magnetic anisotropy in sputtered cobalt-alloy films", J. Apple. Phys. 92, 3223 (2002).

(Continued)

*Primary Examiner*—Kevin M. Bernatz
(74) *Attorney, Agent, or Firm*—Darby & Darby, P.C.

(57) ABSTRACT

A magnetic recording medium deposited on glass and having an orientation ratio greater than one is disclosed. The magnetic recording medium includes a CoW seedlayer deposited on a circumferentially textured glass substrate. The magnetic recording medium with such a seedlayer can have an OR that is similar or higher than that with a NiP seedlayer. Magnetic recording medium with a CoW seedlayer can produce oriented glass media with orientation ratio OR>1 when sputtered on substrates which have been circumferentially textured before the deposition of the CoW seedlayer. The W content of the CoW seedlayer can range between 30-50 at %. The thickness of the CoW seedlayer can range between 10 Å and 200 Å. The method for sputter depositing the magnetic recording medium is also disclosed and includes sputter depositing the CoW seedlayer using pure Ar as sputtering gas or using a mixture of Ar and $O_2$, $H_2O$ and $N_2$ as sputtering gas.

12 Claims, 5 Drawing Sheets

U.S. PATENT DOCUMENTS

| | | |
|---|---|---|
| 6,830,807 B2 * | 12/2004 | Okuyama et al. ............ 428/831 |
| 2002/0045074 A1 | 4/2002 | Yu et al. |
| 2002/0048694 A1 | 4/2002 | Mukai et al. |
| 2002/0132140 A1 | 9/2002 | Igarashi et al. |
| 2002/0146594 A1 | 10/2002 | Takahashi et al. |
| 2003/0072095 A1 | 4/2003 | Saito |
| 2003/0211364 A1 * | 11/2003 | Kanbe et al. ........... 428/694 TS |
| 2004/0005481 A1 | 1/2004 | Osawa |
| 2004/0037005 A1 | 2/2004 | Osawa |

OTHER PUBLICATIONS

G. Khanna et al., "Micromagnetic study of anisotropy sources in textured longitudinal media", IEEE trans. Magn., 37, 1468 (2001).

* cited by examiner

MAGNETIC RECORDING MEDIA USING DIRECTLY TEXTURED GLASS

This application claims priority from U.S. provisional application Ser. No. 60/479,617 filed on Jun. 17, 2003.

BACKGROUND OF THE INVENTION

1. Field of the Invention

The present invention relates generally to the field of disc drive storage, and more particularly to magnetic recording media on directly textured glass substrates.

2. Description of the Related Art

Conventional disc drives are used to magnetically record, store and retrieve digital data. Data is recorded to and retrieved from one or more discs that are rotated at more than one thousand revolutions per minute (rpm) by a motor. The data is recorded and retrieved from the discs by an array of vertically aligned read/write head assemblies, which are controllably moved from data track to data track by an actuator assembly.

The three major components making up a conventional hard disc drive are magnetic media, read/write head assemblies and motors. Magnetic media, which is used as a medium to magnetically store digital data, typically includes a layered structure, of which at least one of the layers is made of a magnetic material, such as CoCrPtB, having high coercivity and high remnant moment. The read/write head assemblies typically include a read sensor and a writing coil carried on an air bearing slider attached to an actuator. This slider acts in a cooperative hydrodynamic relationship with a thin layer of air dragged along by the spinning discs to fly the head assembly in a closely spaced relationship to the disc surface. The actuator is used to move the heads from track to track and is of the type usually referred to as a rotary voice coil actuator. A typical rotary voice coil actuator consists of a pivot shaft fixedly attached to the disc drive housing closely adjacent to the outer diameter of the discs. Motors, which are used to spin the magnetic media at rates of higher than 10,000 revolutions per minute (rpm), typically include brushless direct current (DC) motors. The structure of disc drives is well known.

Magnetic media can be locally magnetized by a read/write head, which creates a highly concentrated magnetic field that alternates direction based upon bits of the information being stored. The highly concentrated localized magnetic field produced by the read/write head magnetizes the grains of the magnetic media at that location, provided the magnetic field is greater than the coercivity of the magnetic media. The grains retain a remnant magnetization after the magnetic field is removed, which points in the same direction of the magnetic field. A read/write head that produces an electrical response to a magnetic signal can then read the magnetization of the magnetic media.

Figure 1A:
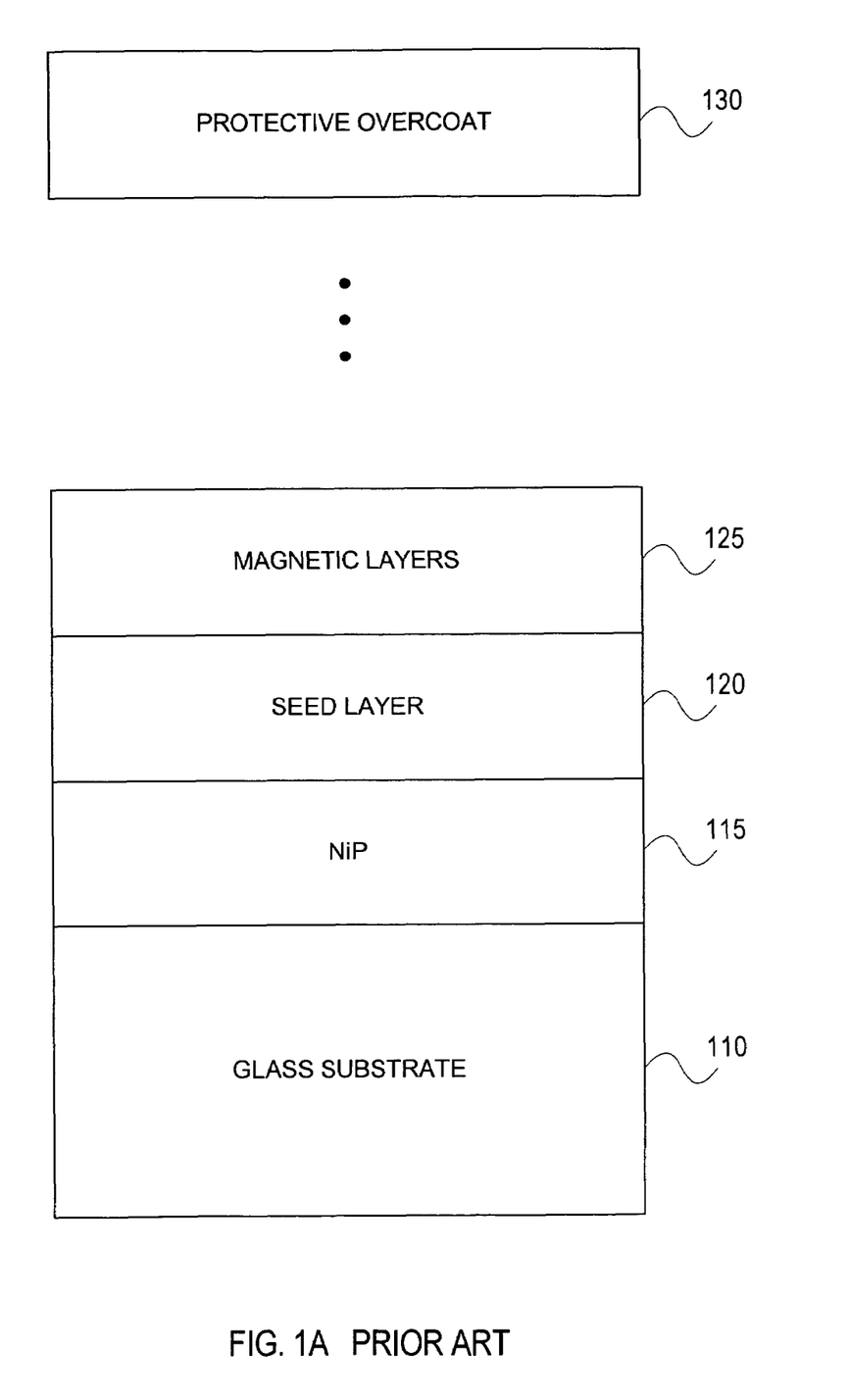
FIG. 1A is a block diagram showing a prior art conventional magnetic media structure using glass substrates.

Magnetic media structures are typically made to include a series of thin films deposited on top of aluminum substrates, ceramic substrates or glass substrates. FIG. 1A illustrates a conventional magnetic media structure built on top of a glass substrate including a glass substrate 110, a nickel-phosphorous (NiP) layer 115, a seed layer 120, a magnetic layer 125 and a protective layer 130. The glass substrate 110 is typically a high quality glass having few defects such as those produced by OHARA Disk (M) SDN. BHD of Melaka, Malaysia. The nickel-phosphorous (NiP) layer 115 is an amorphous layer that is usually electrolessly plated or sputtered onto the glass substrate 110. The NiP layer is used to enhance both the mechanical performance and magnetic properties of the disk. The NiP layer enhances the mechanical properties of the disk by providing a hard surface on which to texture. The magnetic properties are enhanced by providing a textured surface which improves the magnetic properties including the orientation ratio (OR) as is further discussed below. However, the disadvantage of applying the NiP layer 115 is that it adds another step in the process of making magnetic media, which adds to the cost of the magnetic media.

Seed layer 120 is typically a thin film made of chromium that is deposited onto the NiP layer 115 and forms the foundation for structures that are deposited on top of it. Magnetic layer 125, which is deposited on top of seed layer 120, typically include a stack of several magnetic and non-magnetic layers. The magnetic layers are typically made out of magnetic alloys containing cobalt (Co), platinum (Pt) and chromium (Cr), whereas the non-magnetic layers are typically made out of metallic non-magnetic materials. Finally, protective overcoat 130 is a thin film typically made of carbon and hydrogen, which is deposited on top of the magnetic layers 125 using conventional thin film deposition techniques.

Figure 1B:
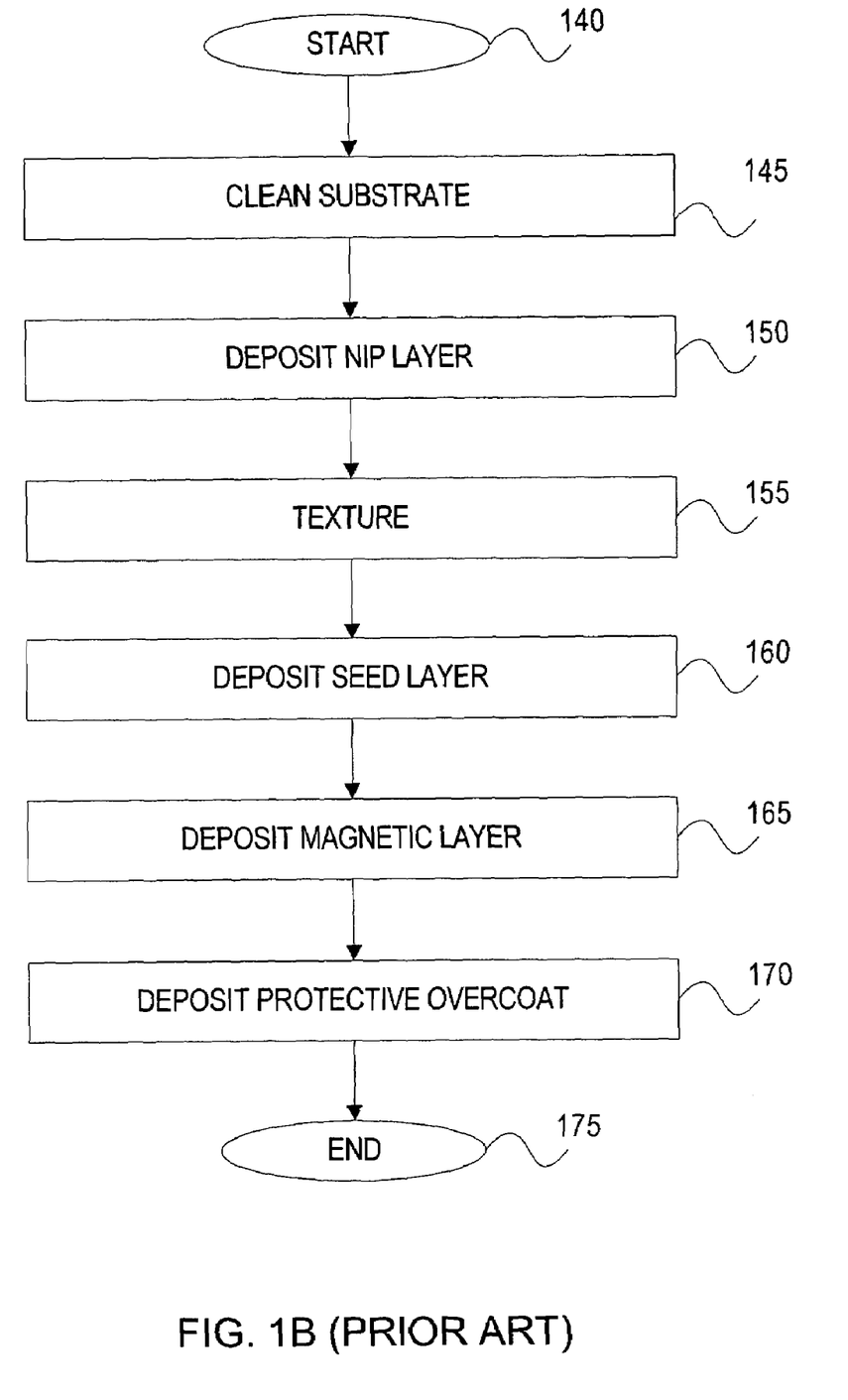
FIG. 1B is a flowchart illustrating the prior art method of making magnetic media using a glass substrate.

FIG. 1B is a flow chart illustrating the prior art conventional method of making the conventional magnetic media structure discussed with reference to FIG. 1A above. First in step 140 a substrate 110 is prepared for deposition prior to cleaning. Next in step 145 the substrate is cleaned using conventional cleaning procedures that clean the substrate and prepares it for thin film deposition. In step 150, the NiP layer 115 is deposited onto the substrate. Typically, the NiP layer 115 is plated onto the substrate, if the substrate is aluminum and sputtered on if the substrate is glass or ceramic. Next in step 155 the NiP layer 115 is mechanically textured. Next in step 160 the seed layer 120 is deposited using conventional thin film deposition techniques. In step 165 the magnetic layer or layers 125 are deposited using similar techniques as used in step 160 to deposit seed layer 120. In step 170, the protective overcoat layer 130 is deposited over the magnetic layers 125. Typically, this protective overcoat layer 130 consists of carbon with hydrogen and is deposited directly after of the previous layer while the substrate remains under vacuum. The protective overcoat layer 130 is typically deposited by transferring the substrate with thin films, while being kept under vacuum, to an adjacent chamber that is isolated from the chambers previously used to deposit films. Protective overcoat layer 130 is typically deposited in an isolated chamber because reactive gasses containing hydrogen or nitrogen can be used in the deposition process. Finally in step 175 the vacuum deposition process ends by moving the conventional media structure into a load lock and unloading the media structure from the vacuum chamber.

Generally, macroscopic in-plane magnetic anisotropy is induced when magnetic recording media are sputtered on mechanically textured NiP coated disk substrates. In such case, the remnant moment ($M_{rt}$) is higher in the circumferential direction than in the radial direction. The orientation ratio $OR_{MRT}$ is defined as the ratio of the measured $M_{rt}$ in the circumferential direction to the measured $M_{rt}$ in the radial direction. Media with $OR_{MRT}$>1 is called oriented media and media with $OR_{MRT}$=1 is called isotropic media. The notation for orientation ratio $OR_{MRT}$ will be abbreviated as OR throughout this disclosure. One way of achieving orientated media on glass substrates 110, is to mechanically texture the NiP layer 115 before films are sputtered onto them as was discussed with reference to FIG. 1B above However, this procedure of depositing a NiP layer 115 onto the glass substrate 110 and mechanically texturing the NiP layer 115 significantly increases the cost of making magnetic media. Magnetic recording media sputtered directly on glass substrates are usually isotropic ($OR_{MRT}=1$).

The advantages of oriented media is that they have higher thermal stability and better recording performance such as narrow pulse width and low media noise compared to isotropic media. However, the disadvantages of making oriented media on glass substrates are the additional cost and processing which is associated with depositing the NiP layer 115 and consequently texturing the NiP layer.

There exists a particular need for a magnetic recording media comprising an alternate substrate, such as glass or ceramic, which exhibits $OR_{MRT}>1$ and is suitable for high aerial density recording application. The conventional ways of achieving oriented media on glass substrates are limited to using either mechanically texture NiP pre-coated glass substrates or sputtering NiP on directly textured glass substrates before the deposition of magnetic layers. Therefore what is needed is an alternative system and method that produces oriented media (OR>1) on glass substrates that is as good, if not better, than the conventional means that use a NiP layer. This alternative media will reduce the cost of making high quality media on glass substrates by providing alternative means of making oriented media on glass that does not require the use of NiP and the associated steps that go along with using a NiP layer.

SUMMARY OF THE INVENTION

This limitation is overcome by making a magnetic recording medium comprising a magnetic media structure having a CoW seedlayer on a directly textured glass substrate. The magnetic recording medium with such a seedlayer can have an OR that is similar or higher than that with a NiP seedlayer. Magnetic recording medium with a CoW seedlayer can produce oriented glass media with orientation ratio OR>1 when sputtered on substrates which have been circumferentially textured before the deposition of the CoW seedlayer. The sputter-deposited CoW seedlayer has a predominately amorphous or nanocrystalline structure or a mixture of amorphous and nanocrystalline structure. The CoW seedlayer is sputter deposited onto the circumferentially textured glass substrate with a gas mixture of Ar and at least one of the following gases including $O_2$, $H_2O$ and $N_2$. The W content of the CoW seedlayer can range between 30-50 at % and the thickness of the CoW seedlayer can range between 10 Å and 200 Å.

In one embodiment of the invention the magnetic recording medium includes a textured glass substrate, a first layer comprising cobalt and tungsten deposited over the textured glass substrate, and a mutli-layer structure having magnetic properties deposited over the first layer. This embodiment can further include a circumferentially textured glass substrate and a CoW layer having an atomic percentage ranging from 30 to 50 atomic percentage, which is sputter deposited in an Ar gas or a gas mixture consisting of Ar and either $O_2$, $H_2O$, or $N_2$. In another embodiment the CoW layer can be deposited directly on top of the circumferentially textured glass substrate.

The mutli-layer structure can include a second layer comprising Cr, a third layer comprising a CrMoTa alloy, a fourth layer comprising a CoCrTa alloy, a fifth layer comprising a first CoCrPtB alloy, a sixth layer comprising a second CoCrPtB alloy, wherein the second CoCrPtB alloy is different than the first CoCrPtB alloy, and a protective overcoat. The protective overcoat can include a carbon containing material such as diamond-like-carbon. In another embodiment of the present invention the second CoCrPtB alloy can contain more boron than the first CoCrPtB alloy.

In another embodiment of the present invention the mutli-layer structure can include a first layer made of $CoW_{40}$, a second layer made of Cr, a third layer made of $CrMo_{10}Ta_3$, a fourth layer made of $CoCr_{14}Ta_4$, a fifth layer made of $Co_{57}Cr_{24}Pt_{13}B_6$, a sixth layer made of $Co_{57}Cr_{15}Pt_{16}B_{12}$ and a carbon containing protective overcoat.

Another embodiment of the present invention includes a method of making a magnetic recording medium including directly texturing a glass substrate, sputter depositing a first layer containing cobalt and tungsten over the textured glass substrate using a gas mixture including pure Ar or a mixture of Ar and either $O_2$, $H_2O$, or $N_2$, and depositing a mutli-layer structure having magnetic properties deposited over the first layer. The glass substrate can be circumferentially textured and the CoW target can be deposited by sputtering a CoW target. In one embodiment a first layer made of $CoW_{40}$ is deposited onto a circumferentially textured glass substrate by sputtering a $CoW_{40}$ target with a sputtering gas consisting of pure Ar or gas mixture consisting of Ar and either $O_2$, $H_2O$, or $N_2$.

BRIEF DESCRIPTION OF THE INVENTION

DETAILED DESCRIPTION OF THE PREFERRED EMBODIMENTS

The invention provides a system and method for high areal density magnetic recording media deposited on glass substrates exhibiting oriented media magnetic properties.

Figure 2:
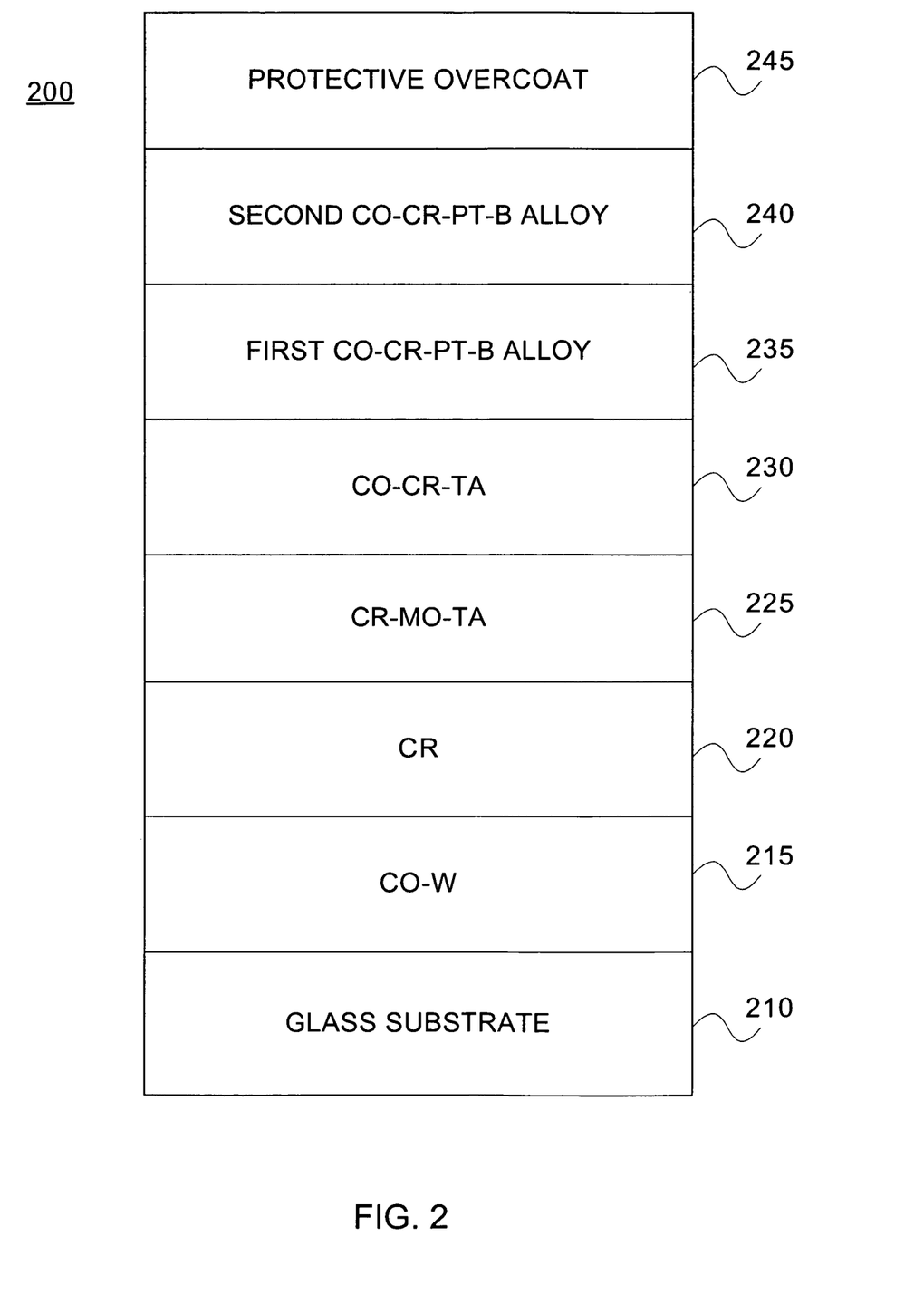
FIG. 2 is a block diagram showing a magnetic media structure using glass substrates in accordance with one embodiment of the invention.

FIG. 2 illustrates a magnetic media structure 200, in accordance with one embodiment of the invention, including a glass substrate 210, a cobalt-tungsten (CoW) layer 215, a chromium (Cr) layer 220, a chromium-molybdenum-tantalum (CrMoTa) layer 225, a cobalt-chromium-tantalum (CoCrTa) layer 230, a first cobalt-chromium-platinum-boron alloy (First CoCrPtB alloy) layer 235, a second cobalt-chromium-platinum-boron alloy (Second CoCrPtB alloy) layer 240, and a protective overcoat layer 245. Specifically, in one embodiment the CoW layer 215 is $CoW_{40}$, the CrMoTa layer 225 is $CrMo_{10}Ta_3$, the CoCrTa layer 230 is $CoCr_{14}Ta_4$, the First CoCrPtB layer 235 is $Co_{57}Cr_{24}Pt_{13}B_6$, and the Second CoCrPtB layer 240 is $Co_{57}Cr_{15}Pt_{16}B_{12}$. Other possible concentrations are discussed below. The compositions and atomic percentages of the layers are directly related to the composition and atomic percentages of the target material being sputtered. For example, sputtering a target having a composition of Mo 10 at % and Ta 3 at % with the balance being Cr grows the CrMo10Ta3 layer. Similarly, sputtering targets of other compositions and atomic percentages grows films of substantially the same composition and atomic percentage in most cases but not all cases as is well known in the art.

Substrate 210 is typically a high quality glass or ceramic substrate that has been circumferentially textured. The CoW layer 215 is a seed layer that has a predominately amorphous or nanocrystalline structure or a mixture of amorphous and nanocrystalline structure. The thickness of the CoW layer 215 is preferably between 10 Å and 200 Å while the W content of the CoW layer 215 is preferably between 30 at % and 50 at %. The CoW layer 215 can be deposited onto the substrate 210 using a variety of thin film growth techniques including sputtering, as is further discussed with reference to FIG. 3 below. In one embodiment the CoW layer 215 is deposited onto the substrate using magnetron sputtering techniques with a gas mixture of Ar and at least one of $O_2$, $H_2O$, or $N_2$. Alternatively other reactive gasses such as $CO_2$, $N_2O$, $H_2$, can be mixed with a noble gas such as Xe or Ar and used to sputter the CoW layer. The CoW layer 215 is used as a seedlayer because a magnetic media structure with a CoW seedlayer has a stronger $(002)\backslash(11\bar{2}0)$ texture than does a magnetic media structure with a NiP seedlayer. The ability of the CoW seedlayer to induce $(002)\backslash(11\bar{2}0)$ texture in the later deposited films is important for orientation ratio (OR). Additionally, the CoW layer 215 can also be used to isolate the later deposited films from the substrate 210. Since the substrate can release contaminants which migrate into the later deposited films, which adversely affects the magnetic properties, the CoW layer 215 serves the function of separating the substrate from the rest of the later deposited structure.

The Cr layer 220, which is deposited on top of the CoW layer 215, is an underlayer that enhances the coercivity of the later deposited magnetic films by orienting the crystal growth. In other embodiments, the Cr layer 220 can be substituted with a Cr-alloy, which may contain at least one alloying element chosen from W, Mo, V, Si, Ti, Mn, Ru, B, Nb, Ta, Zr, and Pt. The CrMoTa layer 225 is a second underlayer and the CoCrTa layer 230 is an intermediate layer. Both of these layers are used to increase the signal-to-media noise ratio (SMNR) of the magnetic media stack as well as the magnetic properties. The combination of the First CoCrPtB alloy layer 235 and Second CoCrPtB alloy layer 240 make up the magnetic layer, which gives the desired magnetic properties including coercivity and total magnetic remnant moment. Protective overcoat layer 245 is a hard overcoat layer that is lubricated and permits the head to glide over the surface without wearing out the media, which could lead to a malfunction of the disc drive. Typically, protective overcoat layer 245 is made of combinations of carbon, hydrogen and nitrogen. Preferably the protective overcoat is diamond-like-carbon which is made up of carbon and hydrogen.

Although the one embodiment described above with reference to FIG. 2 only references one specific concentration of elements in each layer, other embodiments having different concentrations of elements in each layer can be used to produce oriented media. Different embodiments of the invention can include a sputter-deposited CoW layer 215 followed by at least one Cr or Cr-alloy 220 underlayer and at least one magnetic layer on a circumferentially textured substrate to achieve an Mrt orientation ratio greater than one. The underlayer can further have a multi-layer structure with each layer being a Cr-alloy with different alloy content. The intermediate layer can also further have a multi-layer structure consisting of magnetic or non-magnetic materials or a mixture of them. For example, ruthenium (Ru) can be deposited between the CoCrTa layer and the first CoCrPtB layer to make either ferromagnetically or anti-ferromagnetically coupled multi-layer structures. Varying the thickness of the Ru layer changes the coupling of the structure from ferromagnetic to anti-ferromagnetic. The magnetic layer can also have a multi-layer structure with each magnetic layer having different alloy contents. Additionally, the magnetic multi-layer structure may have laminated nonmagnetic interlayers. Finally, the magnetic layer may also include granular structures that have ferromagnetic crystal grains uniformly distributed within a non-magnetic base material.

The CoW layer 215 may also be used for circumferentially textured NiP coated aluminum substrates. Such a usage allows media properties to be less sensitive to the time between substrate pre-wash and sputter-deposition. One advantage of minimizing the effects of time between substrate pre-wash and sputter deposition is that mass production of magnetic media in a factory is easier, more flexible and cheaper.

Figure 3:
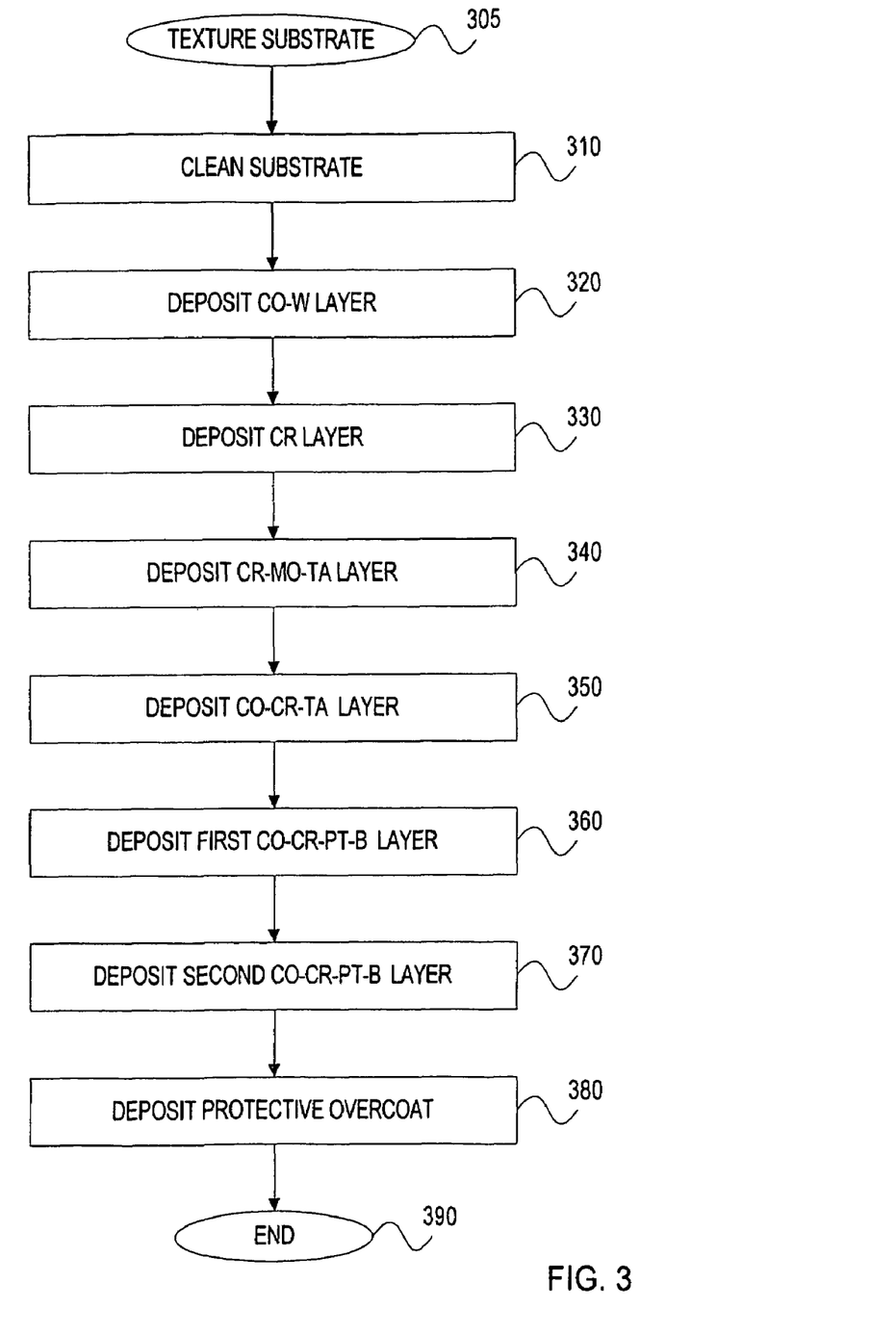
FIG. 3 is a flowchart illustrating the preferred method of making magnetic media structure 200 on a glass substrate.

FIG. 3 is a flowchart illustrating the preferred method of making magnetic media structure 200 on a glass or ceramic substrate. First in step 305 a substrate 210 is circumferentially textured prior to cleaning. In step 305, the glass substrate is textured, using conventional mechanical texturing processes, to have a surface roughness of about 1 Å to about 12 Å. Next in step 310 the substrate is cleaned using a conventional glass cleaning procedure-involving combinations of acids, detergents, alcohol, solvents and water. This step cleans the substrate 210 of any residue left over from the texturing process and prepares the substrate 210 for the subsequent thin film deposition process. In step 320, the CoW layer 215 is deposited onto the substrate 210 creating a predominately amorphous or nanocrystalline structure or a mixture of amorphous and nanocrystalline structure on the substrate. Typically the CoW layer 215 is sputter deposited onto the substrate 210 using conventional thin film growth techniques. Since the CoW is typically sputter deposited, the substrate is loaded into a vacuum deposition apparatus after it is cleaned in step 310 and before the CoW layer 215 is deposited in step 320. The $CoW_{40}$ layer can be sputter deposited onto the substrate, with a direct current (DC) magnetron, from a target that has a composition of 60 at % Co and 40 at % W. Additionally, the sputtering gas can be a mixture Ar and $O_2$, which is optimized for sputtering CoW, and is usually held at a process pressure ranging from 2 millitorr to 12 millitorr. Those skilled in the art will recognize that other thin film deposition processes can be used for this purpose.

Next in step 330 the Cr layer 220 is deposited onto the CoW layer 215. This is typically done in the same deposition apparatus as the CoW was deposited and is usually accomplished by moving the substrate in front of a Cr target or moving the Cr target in front of the substrate and striking a plasma resulting in the deposition of the Cr layer 220 on the CoW layer 215. The Cr layer is deposited in an inert gas environment such as Ar or other noble element gas. Therefore, when reactive gasses such as $O_2$ are used to deposit the CoW, a door or vacuum valve is usually used to isolate the chamber used to deposit the Cr layer as well as other layers.

Next in step 340, the CrMoTa layer 225 is deposited onto the Cr layer 220 using the same apparatus and procedure as used in steps 330 and 340. Next in step 350, the CoCrTa layer 230 is deposited using similar processes as were used in steps 330 through 340. Similarly, the First CoCrPtB alloy layer 235 and the Second CoCrPtB alloy layer 240 are deposited in step 360 and step 370, respectively, using similar processes as were used in the previous steps. In step 370, the protective overcoat layer 245 is deposited over the Second CoCrPtB alloy layer 240. Typically, this protective overcoat layer 245, which consists of carbon with hydrogen, is deposited directly after deposition of the previous deposited magnetic layers while the substrate remains under vacuum. The protective overcoat layer 245 is typically deposited by transferring the substrate with thin films, while being kept under vacuum, to an adjacent chamber that is isolated from the chambers previously used to deposit the CoW layer 215, Cr layer 220, CrMoTa layer 225, CoCrTa layer 230, First CoCrPtB alloy layer 235 and Second CoCrPtB alloy layer 240. Protective overcoat layer 240 is typically deposited in an isolated chamber because reactive gasses containing hydrogen or nitrogen can be used in the deposition process. Finally in step 380 the vacuum deposition process ends by moving the sputtered magnetic media structure 200 into a load lock and unloading the magnetic media structure 200 from the vacuum chamber.

The above-mentioned process can be done with a variety of different thin film deposition processes including but not limited to plasma sputter deposition, ion beam deposition, chemical vapor deposition and reactive ion sputtering as is know to those skilled in the art.

Table 1 shows magnetic properties of various magnetic media structures including a CoW layer sputtered under different gas environments, which include oxygen and no oxygen. Specifically, Table 1 shows the coercivity (Hcr), (Magnetic Remnant Moment)×Thickness (Mrt), squareness (S*), and orientation ratio (OR) of the magnetic media structure seedlayer \Cr\CrMo$_{10}$Ta$_3$\CoCr$_{14}$Ta$_4$\CoCr$_{24}$Pt$_{13}$B$_6$\CoCr$_{15}$Pt$_{16}$B$_{12}$ deposited on textured glass substrates for seedlayer consisting of CoW$_{40}$ sputtered in an Argon gas, CoW$_{40}$ sputter deposited in an Ar+O$_2$ gas, and NiP$_{20}$ sputter deposited in an Ar+O$_2$ gas. The magnetic properties were measured with conventional magnetic measurement tools. For the data shown in Table 1, the CoW$_{40}$ film thickness is approximately 60 Å, the NiP$_{20}$ thickness is approximately 90 Å and the total thickness of the Cr and CrMo$_{10}$Ta$_3$ is 70 Å. In this comparison, the substrates are pre-coated with a CoW$_{40}$ seedlayer or with a NiP$_{20}$ seedlayer before the magnetic recording media are sputtered so that comparison can be made between these two seedlayers. Additionally, the pre-coating of the seedlayer is done within the same sputtering system as the magnetic recording medium without breaking vacuum. Sputtering the seedlayer in a different sputtering system produces similar effects provided care is taken to avoid contamination of the seedlayer when transferred between different sputtering systems. The CoW$_{40}$ is sputtered onto the circumferentially textured glass substrate with a DC magnetron from a target that has a composition of 60 at % Co and 40 at % W. The Ar and O$_2$ mixing ratios for sputtering of CoW$_{40}$ and NiP$_{20}$ are optimized individually to achieve best performance. In Table 1, the CoW$_{40}$ of the sample # 1 was sputtered with pure Ar gas. The CoW$_{40}$ of the sample # 2 was sputtered with an Ar:O$_2$ mixed ratio of 2:1. The NiP$_{20}$ of the sample #3 was sputtered with an Ar:O$_2$ mixed ratio of 1:5. The optimized Ar to O$_2$ gas ratio for seedlayer sputtering depends on target composition, film deposition speed and pumping speed of the sputtering chamber.

In addition to sputter depositing the seedlayer for the structures shown in Table 1, the disks were heated after the deposition of the CoW$_{40}$ seedlayer and before the Cr layer was sputter deposited onto the seedlayer. The sputter deposited CoW$_{40}$ seedlayers of both sample #1 and sample #2 are amorphous or nanocrystalline, as measured by x-ray diffractometry (XRD). Moreover, the quality of the amorphous or nanocrystalline CoW$_{40}$ seedlayer can be modified by using sputter gas which is a mixture of Ar and optimized amounts of O$_2$, H$_2$O or N$_2$. The amount of O$_2$, H$_2$O or N$_2$ mixed with Ar during the sputtering of CoW$_{40}$, needs to be optimized to achieve a magnetic media structure with the highest OR.

TABLE 1

| Sample # | Seedlayer | Hcr | Mrt | S* | OR$_{Mrt}$ |
|---|---|---|---|---|---|
| 1 | CoW | 4620 | 0.30 | 0.87 | 1.23 |
| 2 | CoW w/O$_2$ | 4750 | 0.33 | 0.85 | 1.72 |
| 3 | NiP w/O$_2$ | 4580 | 0.33 | 0.85 | 1.66 |

Table 2 shows magnetic properties as well as recording properties of the magnetic media structure seedlayer \Cr\CrMo$_{10}$Ta$_3$\CoCr$_{14}$Ta$_4$\CoCr$_{24}$Pt$_{13}$B$_6$\CoCr$_{15}$Pt$_{16}$B$_{12}$ deposited on textured glass substrates for seedlayer consisting of CoW$_{40}$ sputter deposited in an Ar+O$_2$ gas, and NiP$_{20}$ sputter deposited in an Ar+O$_2$ gas. The recording properties were measured with a GMR head at 1.1094 inches radius, 5400 rpm and 684 kbpi. These magnetic media structures have identical film structures as those in Table 1 but have slightly different Hcr, Mrt and S* because the substrate's texture scratches are slightly different from that of Table 1. Both the CoW$_{40}$ and NiP$_{20}$ sputtered in an Ar+O$_2$ gas mixture. The signal-to-noise-ratio (SNR) of the magnetic media structure with CoW$_{40}$ seedlayer is slightly better than that with a NiP$_{20}$ seedlayer. Additionally, a separate standard hydrochloric (HCl) acid vapor environment corrosion test, shows that the oriented magnetic media structure with a CoW$_{40}$ seedlayer has better corrosion resistance than the magnetic media structure with a NiP$_{20}$ seedlayer.

TABLE 2

| Sample# | seedlayer | Hcr | Mrt | S* | PW50, μ" | SNR, dB |
|---|---|---|---|---|---|---|
| 4 | CoW w/O$_2$ | 4650 | 0.342 | 0.846 | 2.84 | 13.79 |
| 5 | NiP w/O$_2$ | 4502 | 0.333 | 0.837 | 2.84 | 13.74 |

Figure 4:
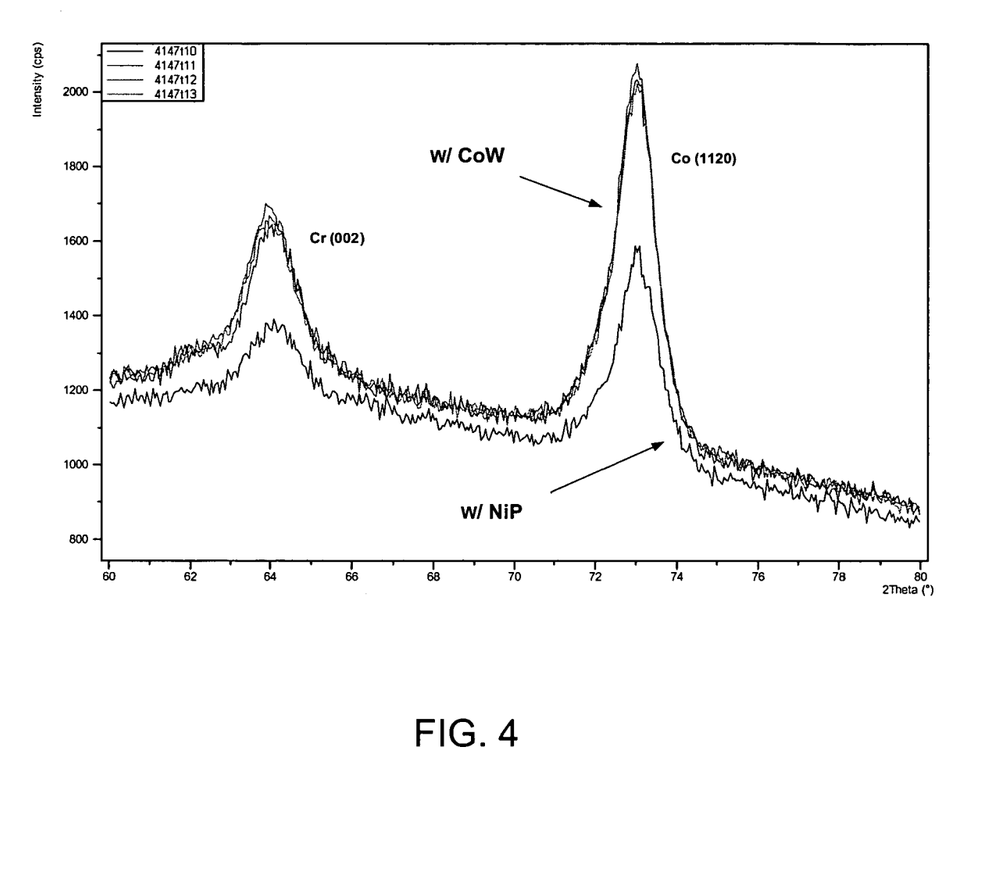
FIG. 4 is a graph showing X-Ray Diffraction (XRD) scans of media sputtered on directly textured glass substrates with CoW and NiP seedlayers.

FIG. 4 is a graph showing and comparing the X-Ray Diffractionn (XRD) scans of media sputtered on directly textured glass substrates with CoW and NiP seedlayers. The oxygen/argon gas ratios used to sputter deposit the CoW seedlayers were the same for samples 4147t11, 4147t12 and 4147t13 but the deposition rates were different. The CoW layer of sample 4147t11 was deposited using the highest deposition rate while the CoW layer of sample 4147t13 was deposited using lowest deposition rate. The oxygen content of the CoW layers is different for all three samples. Sample 4147t10 is different than the other three samples because the seedlayer is NiP sputter deposited with an optimized O$_2$/Ar gas mixture. The orientation ratio (OR) for samples 4147t10, 4147t11, 4147t12 and 4147t13 are 1.66, 1.52, 1.64 and 1.72, respectively. FIG. 4 shows that all films having a CoW seedlayers have a stronger (002)\(11$\bar{2}$0) texture than the film having a NiP seedlayer. These results show that CoW seedlayers induce (002)\(11$\bar{2}$0) texture in the later deposited films, which assists seedlayers in enabling a better OR. Media with a CoW seedlayer can produce oriented glass media with OR>1 when sputtered on substrates which have been circumferentially textured before sputter.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

We claim:

1. A system for recording data, comprising:
   a textured glass substrate;
   a first layer comprising cobalt and tungsten deposited over said textured glass substrate, said first layer has a (002)\(11-20) texture; and
   a mutli-layer structure having magnetic properties deposited over said first layer.

2. The system of claim 1 wherein said textured glass substrate is circumferentially textured glass substrate.

3. The system of claim 1 wherein said first layer is sputter deposited with a reactive gas, said reactive gas comprises a mixture of a noble gas and at least one element or compound selected from the group consisting of $O_2$, $H_2O$, $CO_2$ and $N_2$, wherein the first layer comprises said at least one element or compound selected from the group consisting of $O_2$, $H_2O$, $CO_2$ and $N_2$.

4. The system of claim 3 wherein said reactive gas comprises a mixture of argon and at least one element or compound selected from the group consisting of $O_2$, $H_2O$, $CO_2$ and $N_2$.

5. The system of claim 3 wherein said reactive gas comprises a mixture of argon and $O_2$.

6. The system of claim 1 wherein said first layer comprising cobalt and tungsten has tungsten content of 30 to 50 atomic percentage.

7. The system of claim 1 wherein said first layer comprising cobalt and tungsten has tungsten content of 40 atomic percentage.

8. The system of claim 1 wherein said mutli-layer structure further comprises
   a second layer comprising Cr;
   a third layer comprising a CrMoTa alloy;
   a fourth layer comprising a CoCrTa alloy;
   a fifth layer comprising a first CoCrPtB alloy;
   a sixth layer comprising a second CoCrPtB alloy, wherein said second CoCrPtB alloy is different than said first CoCrPtB alloy;
   and a protective overcoat.

9. A system for recording data, comprising;
   a circumferentially textured glass substrate;
   a first layer comprising cobalt and tungsten deposited directly over said textured glass substrate, said first layer having a tungsten content of 30 to 50 atomic percentage; and
   a mutli-layer structure having magnetic properties deposited over said first layer, wherein the first layer has a (002)\(11-20) texture.

10. The system of claim 9 wherein said first layer is sputter deposited with a reactive gas, said reactive gas further includes a gas mixture comprising of argon and at least one element or compound selected from the group consisting of $O_2$, $H_2O$, and $N_2$, wherein the first layer comprises said at least one element or compound selected from the group consisting of $O_2$, $H_2O$, $CO_2$ and $N_2$.

11. The system of claim 9 wherein said mutli-layer structure further comprises
    a second layer comprising Cr;
    a third layer comprising a CrMoTa alloy;
    a fourth layer comprising a CoCrTa alloy;
    a fifth layer comprising a first CoCrPtB alloy;
    a sixth layer comprising a second CoCrPtB alloy, wherein said second CoCrPtB alloy is different than said first CoCrPtB alloy; and
    a protective overcoat.

12. The system of claim 11 wherein said second CoCrPtB alloy contains more boron than said first CoCrPtB alloy.

* * * * *